United States Patent [19]
Torii et al.

[11] 3,905,456
[45] Sept. 16, 1975

[54] BRAKE ASSEMBLY

[75] Inventors: Tatsumi Torii; Haruo Miyajima, both of Kariya, Japan

[73] Assignee: Alsin Seiki Co., Ltd., Kariya, Japan

[22] Filed: Mar. 10, 1971

[21] Appl. No.: 123,056

Related U.S. Application Data

[63] Continuation of Ser. No. 809,509, March 24, 1969, abandoned.

[30] Foreign Application Priority Data
Mar. 22, 1968 Japan.............................. 43-18672

[52] U.S. Cl...................... 188/79.5 P; 188/196 BA
[51] Int. Cl............................................ F16d 65/54
[58] Field of Search... 188/79.5 B, 79.5 P, 79.5 GC, 188/79.5 GT, 106 A, 196 BA

[56] References Cited
UNITED STATES PATENTS

| | | | |
|---|---|---|---|
| 3,221,842 | 12/1965 | Shampton................. | 188/196 BA X |
| 3,360,083 | 12/1967 | Ayers....................... | 188/196 BA X |
| 3,526,301 | 9/1970 | Ayers....................... | 188/196 BA X |

FOREIGN PATENTS OR APPLICATIONS

| 1,191,320 | 5/1970 | United Kingdom............ 188/79.5 P |

*Primary Examiner*—Duane A. Reger
*Attorney, Agent, or Firm*—Sughrue, Rothwell, Mion, Zinn and Macpeak

[57] ABSTRACT

An automatic vehicle brake assembly, comprising a rotable brake drum, a hydraulic service brake section and an emergency or parking brake section, both said brake sections when actuated separately or jointly are arranged to cooperate with a common pair of brake shoes adapted for frictional cooperation with said drum, said assembly being characterized by the provision of an automatic brake adjuster means which adjusts automatically its length so as to regulate a brake gap.

5 Claims, 4 Drawing Figures

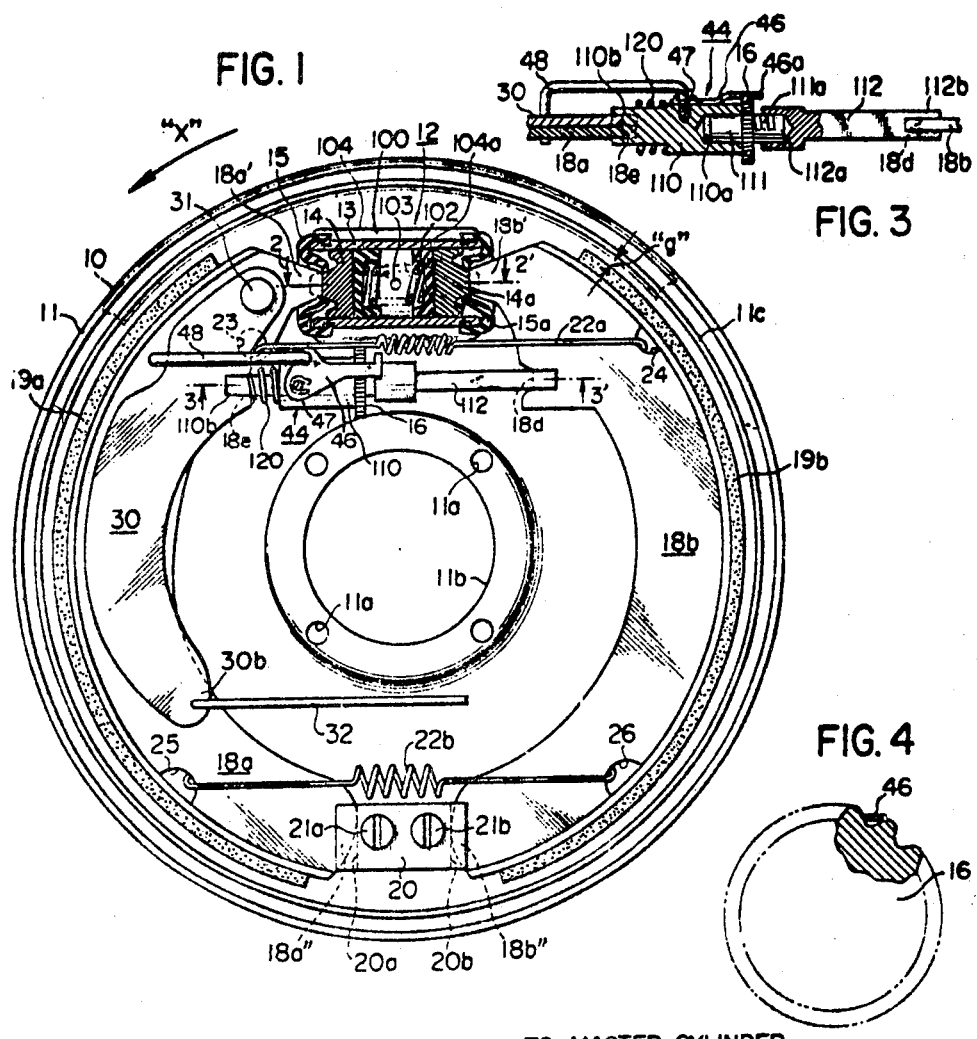
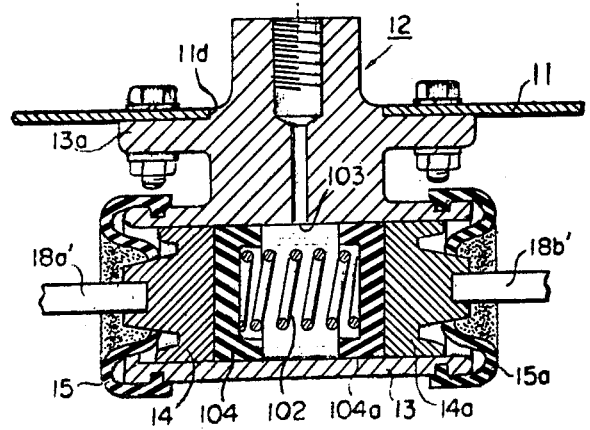

BRAKE ASSEMBLY

This is a continuation of application Ser. No. 809,509, filed Mar. 24, 1969, now abandoned.

This invention relatest generally to improvements in automotive vehicle brake systems. More specifically, it concerns with such an automotive brake system as comprising a hydraulic braking section and a mechanical braking section, said both sections are adapted for actuating at least a pair of brake shoes cooperable with a rotatable brake drum rigidly connected with a vehicle wheel, when the single wheel is only considered for simplicity. Said mechanical brake section may replaced under occasions by a hydraulic one.

The hydraulic braking section is called generally "wheel brake cylinder unit" and operatively connected generally through a master cylinder with a conventional brake pedal, so as to function as a "service brake," while the mechanical brake section is operatively connected with a conventional emergency or parking brake plunger or -lever which is operatable manually by the driver of the vehicle, so as to constitute a "parking" or "emergency" brake system.

A substantial and troublesome drawback inherent in the above type brake mechanisms, preferably of the shoe-expanding type, resides in that with increased wear of frictional elements carried by the expandable shoes the brake action will become inferiorly effective by the corresponding increase of the brake gap through an extended and/or frequent use of the brake.

It is therefore the main object of the present invention to provide an improved brake mechanism of the above type, capable of obviating the aforementioned conventional drawback and of automatically compensating the increased brake gap beyond its design or normal value.

It is a further object of the present invention to provide a brake mechanism of the above kind wherein the automatic brake adjuster means is incorporated ingeniously in the means adapted for conveying the braking effort from the parking or emergency brake actuating means to the brake shoes, thereby simplifying the whole design of the brake assembly and reducing the manufacturing cost even with the employment of the automatic brake gap adjusting character.

These and further objects, features and advantages of the invention will become more clear when read the following detailed description of a preferred embodiment of the invention by reference to the accompanying drawing which constitutes part of the specification.

In the drawing:

FIG. 1 is a front view of main working parts of the brake assembly shown as a sole embodiment of the invention wherein however the hydraulic wheel cylinder unit is shown substantially in its axial section for clear demonstration of several inner parts thereof.

FIG. 2 is an enlarged cross-sectional view of the hydraulic wheel cylinder unit shown in FIG. 1, the section being taken substantially along a section line at 2—2' in FIG. 1.

FIG. 3 is a longitudinal sectional view of an automatic brake adjusting unit employed in the brake assembly shown in FIG. 1, the section being taken substantially along a section lines 3—3' shown in FIG. 1.

FIG. 4 is an explanatory drawing for demonstrating the tooth configuration of a ratchet wheel as a working member of said automatic brake gap adjuster unit, together with an actuating lever adapted for engagement with said ratchet wheel, the drawing being somewhat enlarged relative to the corresponding parts shown in FIGS. 1 and 3.

Referring now to the sole drawing, the invention will be described in detail hereinbelow.

The numeral 10 represents, only partially and by chain-dotted lines, a conventional cup-shaped brake drum which is fixed to the outer end of a rotatable rear axle shaft of an automotive vehicle, although the details have been omitted from the drawing on account of its very popularity. 11 represents a conventional backing plate having generally a centrally perforated disc configuration as shown, the central perforation being shown at 11b. In addition, the plate 11 is formed as conventionally with a peripheral recess at 11c which receives slidingly a peripheral flange formed on the rotatable drum 10, although not shown. The backing plate is formed with a plurality of bolt holes 11a adapted for receiving respective fixing bolts, not shown, for fixingly attaching the plate 11 to a stationary housing of a bearing receiving rotatably said axis shaft, although not shown on account of its popularity. The provision of said central opening 11b serves for receiving said bearing housing as conventionally.

Hydraulic wheel piston-cylinder assembly, generally shown at 12, is fixedly, yet detachably attached on the backing plate 10 by means of conventional fixing means such as bolts, pressure fitting means or the like. For this purpose, the assembly 12 is formed integrally with a mounting plate 13a which is snugly inserted into a corresponding recess 11d, formed through the backing plate (see, FIG. 2). The assembly is provided with a pair of hydraulic pistons 14 and 14a which are arranged slidably in a cylinder block 13 made integral with said mounting plate 13a. In the drawing, the space 101 defined therebetween constituting a variable hydraulic chamber for actuating said pistons 14 and 14a. The cylinder wall part constituting said hydraulic chamber 101 is formed with a communication opening 103 which is kept in communication with a conventional hydraulic master cylinder, not shown, for the supply and discharge of pressure oil to and from said chamber, as will be more fully described hereinafter, by means of a flexible tubing. The hydraulic chamber is formed further with a vent opening adapted for discharging air from the chamber when hydraulic pressure is applied to the assembly 12, although not shown. In addition, a coil spring 102 is positioned between the hydraulic pistons 14 and 14a and which is kept in its compressed state for keeping them always separated from each other and transmitting motion from one to another of said pistons. Each of the pistons 14 and 14a is fitted at its inside or hydraulic pressure-receiving end with a piston cup 104 or 104a which is naturally made of an elastic substance such as rubber for assuring an effective seal against occasional escapement of the pressure oil occasionally prevailing within the hydraulic chamber 101.

Dust-proof cover 15 or 15a, made of an elastic substance such as plastics or rubber, is bridged flexibly between the hydraulic cylinder 13 and each of said pistons 14 and 14a, as shown.

A pair of brake shoes 18a and 18b is provided which shoes are formed into arcuate rigid arms as shown, and frictional liner elements 19a and 19b are attached fixedly on the outer arcuate surfaces of said shoes, respectively such as by means of glue or the like attaching agent, as conventionally. The upper and inner extremities 18a' and 18b' of the shoes are kept in pressure engagement with channel-shaped parts of the hydraulic pistons 14 and 14a, so as to provide tongue-and-groove joints between the both kinds of operating parts, although these channels are not clearly shown in FIG. 1.

The lower and inner extremities 18a'' and 18b'' of the shoes are rounded and kept in pressure engagement with receiving channel-shaped recesses 20a and 20b, respectively, formed at the both extremities of a stationary anchor 20, the latter being fixedly mounted on the backing plate 11 by means of set screws 21a and 21b. Thus, the shoe ends 18a'' and 18b'' are slidable to a certain extent up or down in FIG. 1, as well as pivotable in the plane of the drawing paper. For insuring the aforementioned pressure engagement of the shoes with the respective hydraulic pistons, on the one hand, and with the stationary anchor, on the other hand, there are provided two tension springs 22a and 22b which are bridged between the shoes as shown. For this purpose, anchoring recesses 23–26 are formed in the outer peripheral surfaces of said shoes for receiving the inwardly turned ends of said tension springs 22a and 22b.

Manually operatable lever 30 is pivoted with its upper end by a pivot pin 31 attached fixedly on the upper end of the left-hand brake shoe 18a, while the lower end of the lever 30 is mechanically connected through a connecting wire 32 to a conventional parking brake plunger or lever, mostly of the manual type, not shown.

Automatic clearance adjuster assembly, most clearly and generally shown at 44 in FIGS. 3–4, comprises a main body 110 which is formed with a longitudinal blind bore 110a receiving rotatably as well as slidably a pin 111, ratchet wheel 16 being attached fixedly to said pin at its intermediate part. The remaining half of the pin 111 is male threaded at 111a which threads are kept in meshing with corresponding female threads formed in a longitudinal blind bore 112a at one end of pusher rod 112. The opposite or outer end 112b of this rod 112 is formed into a fork and kept in pivotal connection with a recess 18d formed on the inside periphery of said shoe 18b.

Actuating lever 46 made of leaf spring is pivotably mounted with its root end at 47 on the main body 110 and with its free end 46a kept in meshing with said ratchet wheel 16. As seen from FIG. 1, the actuating lever 46 is formed in its plan view into substantially a triangular shape, one of its apices is pivoted at 47 as above referred to and second apex is linkedly connected through a link member 48, shaped preferably into a U-piece as shown in FIG. 3, to the first shoe 18a. An extension 110b of reduced diameter is formed integrally at the outer end of the main body 110, the outer end of said extension being shaped into a fork which is kept in pivotal connection with a common recess 18e formed on the upper and inside peripheries of both shoe 18a and lever 30, as seen from FIG. 3. A compression spring 120 is provided around said extension 110b and between the related shoe 18a and the main body of adjuster assembly 44 under compression.

Although the description has been directed to a brake mechanism for one of the rear vehicle wheels, it should be naturally understood that a similar mechanism is fitted to the remaining rear wheel. Naturally, similar brake mechanisms may be fitted to respective front vehicle wheels, as conventionally.

The operation of the brake mechanism so far shown and described is as follows. It should be however understood that the following description on the operation will be exclusively directed to a single brake mechanism for one vehicle wheel only, for the purpose of simplicity of the description.

When the driver of the vehicle desires to brake the running vehicle by use of the conventional hydraulic or combined hydropneumatic service brake system, he depresses as usually a conventional vehicle brake pedal, not shown, thus pressure oil is conveyed from the master cylinder, not shown, through a flexible tube and the passage opening 103 into the working chamber 101 of double piston-cylinder assembly 12, acting as a conventional wheel brake cylinder. Since the cylinder 13 is fixedly mounted, pistons 14 and 14a are urged to move outwards in opposite directions to each other, depending upon the oil pressure conveyed to the working chamber, thereby the brake shoes 18a and 18b being expanded forcibly around their slidably anchored points 18a'' and 18b'', respectively, so as to bring the upper parts of the frictional elements 19a and 19b in FIG. 1 into sliding pressure contact with the inside wall surfaces of brake drum 10 rotating in counter clockwise direction as shown by an arrow X, upon filling up the regular brake gap g in FIG. 1 which amounts to about 1.5–2.0 mm. Reaction forces thus produced against the frictional elements 19a and 19b will be transmitted to the anchor 20 through the shoes 18a and 18b, and thus the shoes 18a and 18b will reacted by the anchor 20. Thus the under parts of the frictional elements 19a and 19b in FIG. 1 will be brought into pressure contact with the inside wall surface of the brake drum 10, because the shoe ends 18a'' and 18b'' slides down in FIG. 1. Thus, the brake mechanism shown in FIGS. 1 and 2 will perform its braking function in the manner of a "leading-trailing type brake" commonly known per se. Rotation of brake drum 10 in the direction of the arrow X corresponds to the forward rotation of the vehicle wheel.

Or alternatively, when the driver desires to actuate the parking brake system, he pulls manually the plunger, not shown, towards him. Therefore, motion is transmitted therefrom through transmission wire 32 so as to rotate the lever 30 in counter clockwise direction in FIG. 1 around the pin 31, thereby the second shoe 18b being expanded around their slidably anchored point 18b'', so as to bring the upper part of the frictional element 19b into pressure contact with the inside wall surface of the rotating brake drum 10.

Simultaneously with the counter clockwise rotation of the lever 30, the first brake shoe 18a is expanded outwards about their slidably anchored point 18a'', under the influence of the transmitted force through the pin 31.

Thus the frictional elements 19a and 19b will be brought into sliding and pressure contact with the rotating brake drum 10 in the same manner as described hereinabove concerning to the service brake system.

When the service brake or the parking brake is applied, the upper shoe ends 18a' and 18b' will be urged as before. The expanded first shoe 18a will provide a pull through link 48 to elastic lever 46 so that the latter will be caused to rotate in counter clockwise direction in FIG. 1 around its pivot 47.

If the brake gap g is a certain predetermined and regular value, the actuator and 46a of the lever 46, which is slipped on the ratchet wheel 16, is slippingly returned to its original position without rotating the ratchet wheel in accordance with release of the brake.

However, if the brake gap g should increase beyond a certain predetermined value on account of excessive wear of the respective frictional elements 19a and 19b, the results will be as follows.

When the service brake or the parking brake is applied, the upper shoe ends 18a' and 18b' will be urged to expand as before. The expanded first shoe 18a will provide a pull through link 48 to elastic lever 46 so that the latter will be caused to rotate in counter clockwise direction in FIG. 1 about its pivot 47, thus the actuator end 46a of the lever 46 being slippingly advanced one tooth pitch with the ratched wheel 16 kept position without rotation. When the service brake or the parking brake is released mainly under the influence of return spring 22a, the shoes contact to each other and therefore the actuator lever 46 is urged to rotate in clockwise direction in FIG. 1, thereby advancing a certain distance the pusher rod 112 rightwards by the threaded engagement at 111a–112a. In this way, the once enlarged brake gap is adjusted back to the design value g. Since this gap adjusting operation is carried out during the return or contracting stroke of the shoes, the adjusting rotation of ratchet wheel 16 together with pin 111 is released from the brake load and smoother and lighter than otherwise.

The above mentioned gap adjusting operation can be brought about in the similar way during the return stroke of the parking brake through the mechanical linkage connecting the both brakes. In the foregoing embodiment, with the rotation of brake drum in the counter clockwise direction X in FIG. 1 and with the shoes thus applied, the brake mechanism will act in the case of the parking brake working mode, as a kind of duoservo-brake system which provides a considerably large braking force with a comparatively small manual braking effort. In the case of backward running of the vehicle, thus the brake drum 10 rotates in the clockwise direction in FIG. 1, similar braking effects will be realized.

When the parking brake is applied while the service brake is being used, for the parking purpose, or in an emergency, as occasion may desire, the results will be the addition of the both braking effects.

Without further detail description, the foregoing will so fully reveal the gist of the present invention that those skilled in the art can by applying current knowledge readily adapt it for various applications without omitting features that, from the standpoint of prior art, fairly constitute essential characteristics of the generic or specific aspects of this invention, and therefore, such adaptations should be intended to be comprehended within the range of equivalence of the following claims.

What we claim is:

1. An automotive vehicle brake assembly comprising, a stationary backing plate fixedly attached to an axle support means, a pair of brake shoes movably disposed on said backing plate opposite one another, a hydraulic actuator disposed on said backing plate between two adjacent ends of said brake shoes and operatively connected therewith, a stationary anchor secured to said backing plate between the two remaining adjacent ends of said brake shoes, said remaining adjacent ends of said brake shoes being in abutting relationship with said stationary anchor, a rotatable brake drum positioned around said brake shoes for frictional engagement therewith, an automatic brake adjusting means positioned adjacent said hydraulic actuator, one end of said automatic adjusting means being operatively connected with one of said brake shoes and the other end of said automatic adjusting means being operatively connected with the other of said brake shoes, said one of end of said automatic adjusting means having a threaded ratchet wheel assembly attached thereto, said ratchet wheel assembly including a wheel having pawl teeth formed on its outer periphery and screw portion in threaded engagement with said wheel, a ratchet wheel actuating means movably connected with said one end of said automatic adjusting means and being operatively connected with said one brake shoe, said ratchet wheel actuating means comprising a resilient lever, said resilient lever being adapted for rotation with relative movement between said shoe and said ratchet wheel assembly for rotating said ratchet wheel to extend said screw portion from said ratchet wheel, a mechanically actuated lever having one end thereof pivotally connected to one of said brake shoes adjacent said hydraulic actuating means and the other end thereof operatively connected to a mechanical actuating means, said one end of said automatic adjusting means being operatively connected to said mechanically actuated lever between the ends thereof and adjacent the end that is pivotally connected to said brake shoe, and biasing means connected to each of said brake shoes for biasing said brake shoes to their non-applied position, whereby, when said brake shoes are actuated said resilient lever is caused to move relative to said ratchet wheel to adjust the clearance between said brake shoes and said rotating brake drum when said brake shoes are returned to their non-apply position and the clearance between said brake shoes and said rotating brake drum exceeds a predetermined amount.

2. An automotive vehicle brake assembly comprising, a stationary backing plate fixedly attached to an axle support means, a pair of brake shoes movably disposed on said backing plate opposite one another, a hydraulic actuator disposed on said backing plate between two adjacent ends of said brake shoes and operatively connected therewith, a stationary anchor secured to said backing plate between the two remaining adjacent ends of said brake shoes, said remaining adjacent ends of said brake shoes being in abutting relationship with said stationary anchor, a rotatable brake drum positioned around said brake shoes for frictional engagement therewith, an automatic brake adjusting means positioned adjacent said hydraulic actuator, one end of said automatic adjusting means being operatively connected with one of said brake shoes and the other end of said automatic adjusting means being operatively connected with the other of said brake shoes, said one end of said automatic adjusting means having a threaded ratchet wheel assembly attached thereto, a biasing means positioned between said ratchet wheel assembly and said one of said brake shoes for biasing said automatic adjusting means away from said one brake shoe, and a ratchet wheel actuating means pivotally mounted on said one end of said automatic adjusting means and being operatively connected with said one brake shoe, and biasing means connected to each of said brake shoes for biasing said brake shoes to their non-applied position, whereby when said brake shoes are actuated said automatic adjusting means is biased away from said one brake shoe and is actuated to adjust the clearance between said brake shoes and said rotating brake drum when said brake shoes are returned to their non-apply position and the clearance between said brake shoes and said rotating brake drum exceeds a predetermined amount.

3. An automotive vehicle brake assembly as claimed in claim 2, wherein said ratchet wheel actuating means comprises a resilient lever, one end of said resilient lever pivotally mounted on said automatic adjusting means and the other end of said resilient lever being operatively engaged with said ratchet wheel, and further including a link member having one end thereof operatively connected with said one end of said resilient lever and the other end thereof operatively connected with said one brake shoe, whereby when said brake shoes are applied, said resilient lever is caused to move relative to said ratchet wheel and cause said ratchet wheel to rotate when said brake shoes are returned to their non-apply position.

4. An automotive vehicle brake assembly as claimed in claim 2 further comprising, a mechanically actuated lever having one end thereof pivotally connected to one of said brake shoes adjacent said hydraulic actuating means and the other end thereof operatively connected to a mechanical actuating means, said one end of said automatic adjusting means being operatively connected to said mechanically actuated lever between the ends thereof and adjacent the end that is pivotally connected to said brake shoe.

5. An automotive vehicle brake assembly as claimed in claim 2, wherein said hydraulic actuator means comprises a wheel cylinder body fixedly attached to said backing plate, a pair of pistons slidably positioned in said cylinder body and operatively connected with the adjacent ends of said brake shoes, and a spring positioned between said pair of pistons, said wheel cylinder body being hydraulically connected to a pressure supply source for hydraulically actuating said vehicle brake assembly.

* * * * *